United States Patent
Hus et al.

(10) Patent No.: US 6,742,010 B1
(45) Date of Patent: May 25, 2004

(54) DUAL-BLOCK DISCRETE CONSINE TRANSFORM METHOD

(75) Inventors: Wei-Lien Hus, Austin, TX (US); Frank J. Gorishek, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 538 days.

(21) Appl. No.: 09/613,015

(22) Filed: Jul. 10, 2000

(51) Int. Cl.⁷ ............................................. G06F 17/14
(52) U.S. Cl. ...................................... 708/401; 708/402
(58) Field of Search ................................ 708/400–409, 708/524

(56) References Cited

U.S. PATENT DOCUMENTS

| | | | |
|---|---|---|---|
| 5,483,475 A | | 1/1996 | Kao |
| 5,590,066 A | | 12/1996 | Ohki |
| 5,596,517 A | | 1/1997 | Jones et al. |
| 5,610,849 A | | 3/1997 | Huang |
| 5,754,456 A | * | 5/1998 | Eitan et al. |
| 5,845,112 A | * | 12/1998 | Nguyen et al. |
| 6,038,580 A | * | 3/2000 | Yeh |
| 6,317,767 B2 | * | 11/2001 | Wang |
| 6,397,235 B1 | * | 5/2002 | Van Eijndhoven et al. . 708/401 |
| 6,507,614 B1 | * | 1/2003 | Li |

OTHER PUBLICATIONS

Hung et al., "Statistical Inverse Discrete Cosine Transforms for Image Compression," May 1994, SPIE vol. 2187, pp. 196–205.
Ara et al., "A Fast DCT–SQ Scheme for Images," The Transactions of the IEICE, vol. E71, No. 11, Nov. 1988, pp. 1095–1097.
*Intel Architecture Software Developer's Manual, vol. 2: Instruction Set Reference*, 1999.

"Enhanced 3DNow!™ Technology for the AMD Athlon™ Processor," Aug. 2000, pp. 1–11.
"Inside 3DNow!™ Technology," © 2001 Advanced Micro Devices, Inc., pp. 1–4.
"3DNow!™ Technology in Microsoft DirectX 6.x," © 2001 Advanced Micro Devices, Inc. pp. 1–6.

(List continued on next page.)

Primary Examiner—Tan V. Mai
(74) Attorney, Agent, or Firm—Meyertons Hood Kivlin Kowert & Goetzel, P.C.; B. Noël Kivlin

(57) ABSTRACT

A system and method for carrying out a two-dimensional forward and/or inverse discrete cosine transform is disclosed herein. In one embodiment, the method comprises: (1) receiving multiple data blocks; (2) grouping together one respective element from each of the multiple data blocks to provide full data vectors for single-instruction-multiple-data (SIMD) floating point instructions; and (3) operating on the full data vectors with SIMD instructions to carry out the two dimensional transform on the multiple data blocks. Preferably the two dimensional transform is carried out by performing a linear transform on each row of the grouped elements, and then performing a linear transform on each column of the grouped elements. The method may further include isolating and arranging the two dimensional transform coefficients to form transform coefficient blocks that correspond to the originally received multiple data blocks. The multiple data blocks may consist of exactly two data blocks. The method may be implemented in the form of software and conveyed on a digital information storage medium or information transmission medium. The dual forward or inverse discrete cosine transform methodology may be employed within a general purpose computer or within a computation unit of a multimedia encoder or decoder system, implemented either in hardware or software. A multimedia encoder or decoder employing the fast, forward or inverse discrete cosine transform methodology in accordance with the present invention may advantageously achieve high performance.

16 Claims, 8 Drawing Sheets

OTHER PUBLICATIONS

"3DNow!™ Fact Sheet," © 2001 Advanced Micro Devices, Inc., p. 1.

"AMD 3DNow!™ Frequently Asked Questions," © 2001 Advanced Micro Devices, p. 1.

*3DNow!™ Technology Manual*, © 2000 Advanced Micro Devices, Inc., pp. 1–62.

*AMD Extensions to the 3DNow!™ and MMX™ Instructions Sets Manual*, © 2000 Advanced Micro Devices, pp. 1–36.

* cited by examiner

| | Base 10 | Binary |
|---|---|---|
| Scalar Multiplication | | |
| Scalar Multiplicand | 24 | 0001 1000 (8-Bit) |
| Scalar Multiplier | 200 | 1100 1000 (8-Bit) |
| Scalar Final Product | 4800 | 0001 0010 1100 0000 (16-Bit) |
| | | |
| Vector Multiplication | | |
| Vector Multiplicand | (12, 5) | 1100 0101 (4 Bits Per Component) |
| Vector Multiplier | (7, 4) | 0111 0100 (4 Bits Per Component) |
| Vector Final Product | (84, 20) | 0101 0100 0001 0100 (8 Bits Per Component) |

FIG. 1

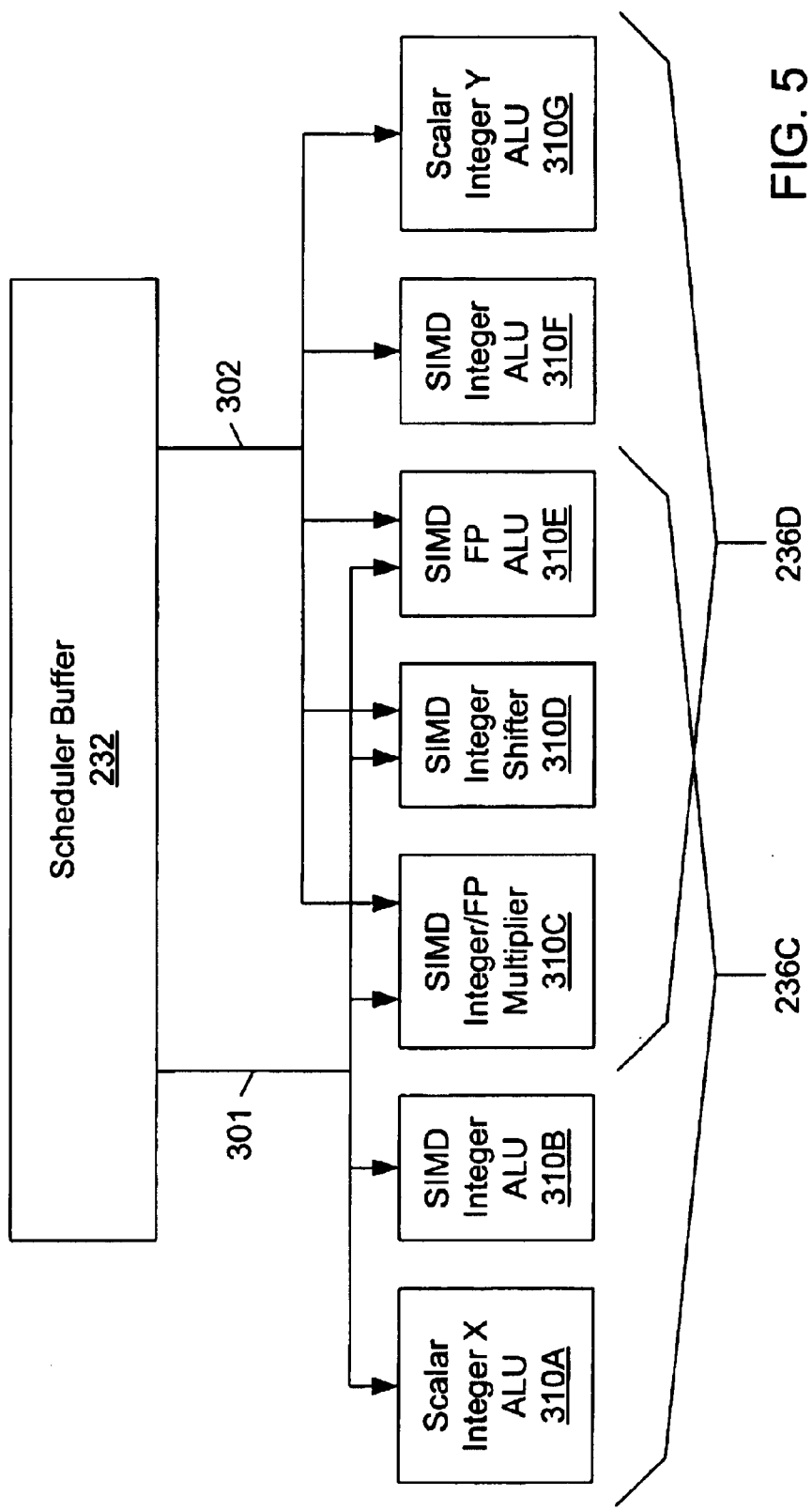

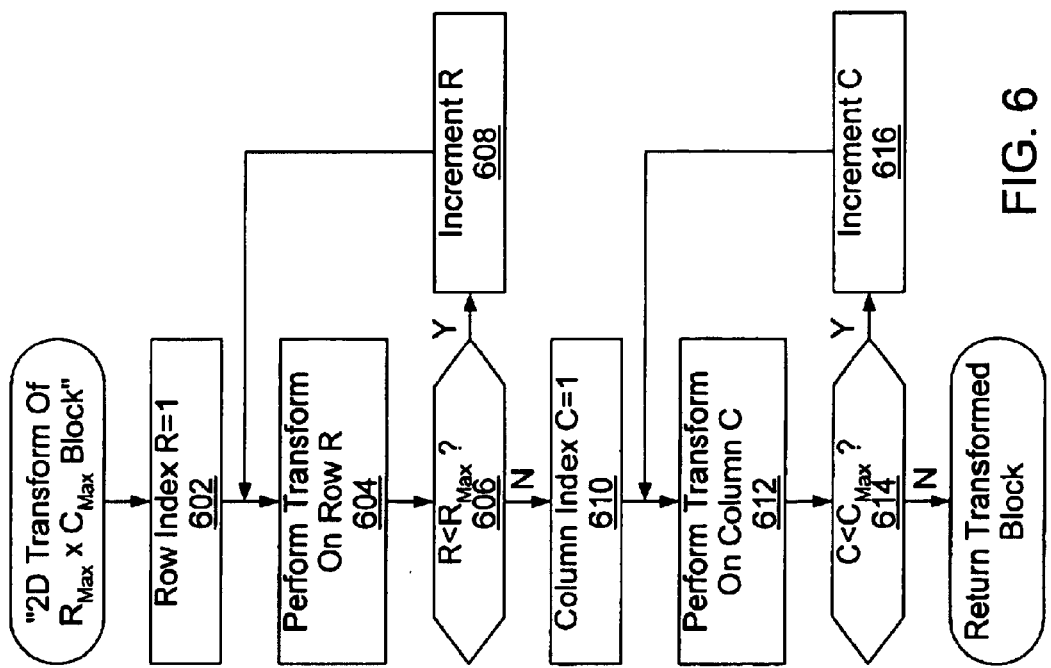

| A11 | A12 | A13 | A14 |
|-----|-----|-----|-----|
| A21 | A22 | A23 | A24 |
| A31 | A32 | A33 | A34 |
| A41 | A42 | A43 | A44 |

FIG. 8A

| AR1 | AR2 | AR3 | AR4 |
|-----|-----|-----|-----|

FIG. 8B

| A11' | A12' | A13' | A14' |
|------|------|------|------|
| A21' | A22' | A23' | A24' |
| A31' | A32' | A33' | A34' |
| A41' | A42' | A43' | A44' |

FIG. 8C

| A1C' | A2C' | A3C' | A4C' |
|------|------|------|------|

FIG. 8D

| A11" | A12" | A13" | A14" |
|------|------|------|------|
| A21" | A22" | A23" | A24" |
| A31" | A32" | A33" | A34" |
| A41" | A42" | A43" | A44" |

| A11 | A12 | A13 | A14 | B11 | B12 | B13 | B14 |
|-----|-----|-----|-----|-----|-----|-----|-----|
| A21 | A22 | A23 | A24 | B21 | B22 | B23 | B24 |
| A31 | A32 | A33 | A34 | B31 | B32 | B33 | B34 |
| A41 | A42 | A43 | A44 | B41 | B42 | B43 | B44 |

FIG. 9B

| AR1 | BR1 | AR2 | BR2 | AR3 | BR3 | AR4 | BR4 |

FIG. 9C

| A11' | B11' | A12' | B12' | A13' | B13' | A14' | B14' |
|------|------|------|------|------|------|------|------|
| A21' | B21' | A22' | B22' | A23' | B23' | A24' | B24' |
| A31' | B31' | A32' | B32' | A33' | B33' | A34' | B34' |
| A41' | B41' | A42' | B42' | A43' | B43' | A44' | B44' |

FIG. 9D

| A1C' | B1C' | A2C' | B2C' | A3C' | B3C' | A4C' | B4C' |

FIG. 9E

| A11" | A12" | A13" | A14" | B11" | B12" | B13" | B14" |
|------|------|------|------|------|------|------|------|
| A21" | A22" | A23" | A24" | B21" | B22" | B23" | B24" |
| A31" | A32" | A33" | A34" | B31" | B32" | B33" | B34" |
| A41" | A42" | A43" | A44" | B41" | B42" | B43" | B44" |

DUAL-BLOCK DISCRETE CONSINE TRANSFORM METHOD

BACKGROUND

1. Field of the Invention

The present invention relates generally to systems and methods for performing discrete cosine transform (DCT) and inverse discrete cosine transform (IDCT) operations. The invention also relates to digital video compression and decompression, and more particularly to a video encoder and decoder for performing the discrete cosine transform and/or inverse discrete cosine transform with improved efficiency and reduced computational requirements.

2. Description of the Related Art

DSP theory provides a host of tools for the analysis and representation of signal data. The discrete cosine transform and its inverse are among the more ubiquitous of these tools in multimedia applications. The discrete cosine transform (DCT) of a discrete function $f(j)$, $j=0, 1, \ldots, N-1$ is defined as $$F(k) = \frac{2c(k)}{N} \sum_{j=0}^{N-1} f(j) \cdot \cos\left[\frac{(2j+1)k\pi}{2N}\right],$$

where $k = 0, 1, \ldots, N-1$, and $$c(k) = \begin{cases} \frac{1}{\sqrt{2}} & \text{for } k = 0 \\ 1 & \text{for } k \neq 0 \end{cases}.$$

The inverse discrete cosine transform (IDCT) is defined by $$f(j) = \sum_{k=0}^{N-1} c(k) F(k) \cos\left[\frac{(2j+1)k\pi}{2N}\right],$$

where $j = 0, 1, \ldots, N-1$.

The discrete cosine transform may be used in a wide variety of applications and allows an arbitrary input array size. However, the straightforward DCT algorithm is often prohibitively time-consuming especially when executed on general purpose processors. In 1977, Chen et al. disclosed an efficient algorithm for performing the DCT in an article entitled "A Fast Computational Algorithm for the Discrete Cosine Transform", published in IEEE Transactions on Communications, Vol. COM-25, No. 9, September 1977, authored by Wen-Hsiung Chen, C. Harrison Smith and S. C. Fralick, which is hereby incorporated by reference. Fast DCT algorithms such as that disclosed by Chen et al. are significantly more efficient that the straightforward DCT algorithm. Nevertheless, there remains room for improvement, particularly when the algorithm is employed in specific circumstances.

Traditional x86 processors are not well adapted for the types of calculations used in signal processing. Thus, signal processing software applications on traditional x86 processors have lagged behind what was realizable on other processor architectures. There have been various attempts to improve the signal processing performance of x86-based systems. For example, microcontrollers optimized for digital signal processing computations (DSPs) have been provided on plug-in cards or the motherboard. These microcontrollers operated essentially as hardwired coprocessors enabling the system to perform signal processing functions.

As multimedia applications become more sophisticated, the demands placed on computers are redoubled. Microprocessors are now routinely provided with enhanced support for these applications. For example, many processors now support single-instruction multiple-data (SIMD) commands such as MMX instructions. Advanced Micro Devices, Inc. (hereinafter referred to as AMD) has proposed and implemented 3DNow!™, a set of floating point SIMD instructions on x86 processors starting with the AMD-K6®-2. The AMD-K6®-2 is highly optimized to execute the 3DNow!™ instructions with minimum latency. Software applications written for execution on the AMD-K6®-2 may use these instructions to accomplish signal processing functions and the traditional x86 instructions to accomplish other desired functions.

The 3DNow! instructions, being SIMD commands, are "vectored" instructions in which a single operation is performed on multiple data operands. Such instructions are very efficient for graphics and audio applications where simple operations are repeated on each sample in a stream of data. SIMD commands invoke parallel execution in superscalar microprocessors where pipelining and/or multiple execution units are provided.

Vectored instructions typically have operands that are partitioned into separate sections, each of which is independently operated upon. For example, a vectored multiply instruction may operate upon a pair of 32-bit operands, each of which is partitioned into two 16-bit sections or four 8-bit sections. Upon execution of a vectored multiply instruction, corresponding sections of each operand are independently multiplied. FIG. 1 illustrates the differences between a scalar (i.e., non-vectored) multiplication and a vector multiplication. To quickly execute vectored multiply instructions, microprocessors such as the AMD-K6®-2 use a number of multipliers in parallel.

FIG. 2 illustrates one embodiment of a representative computer system 100 such as the AMD-K6®-2 which is configured to support the execution of general-purpose instructions and parallel floating-point instructions. Computer system 100 may comprise a microprocessor 110, memory 112, bus bridge 114, peripheral bus 116, and a plurality of peripheral devices P1–PN. Bus bridge 114 couples to microprocessor 110, memory 112 and peripheral bus 116. Bus bridge 114 mediates the exchange of data between microprocessor 110, memory 112 and peripheral devices P1–PN.

Microprocessor 110 is a superscalar microprocessor configured to execute instructions in a variable length instruction set. A subset of the variable length instruction set is the set of SIMD (simultaneous-instruction multiple-data) floating-point instructions. Microprocessor 110 is optimized to execute the SIMI floating-point instructions in a single clock cycle. In addition, the variable length instruction set includes a set of x86 instructions (e.g. the instructions defined by the 80486 processor architecture).

Memory 112 stores program instructions which control the operation of microprocessor 110. Memory 112 additionally stores input data to be operated on by microprocessor 110, and output data generated by microprocessor 110, in response to the program instructions. Peripheral devices P1–PN are representative of devices such as network interface cards (e.g. Ethernet cards), modems, sound cards, video acquisition boards, data acquisition cards, external storage media, etc. Computer system 100 may be a personal computer, a laptop computer, a portable computer, a television, a radio receiver and/or transmitter, etc.

FIG. 3 illustrates one embodiment for microprocessor 110. Microprocessor 110 may be configured with 3DNow!™ and MMX® technologies. Microprocessor 110 may comprise bus interface unit 224, predecode unit 212, instruction cache 214, decode unit 220, execution engine 230, and data cache 226. Microprocessor 110 may also include store queue 238 and an L2 cache 240. Additionally, microprocessor 110 may include a branch prediction unit and a branch resolution unit (not shown) to allow efficient speculative execution.

Predecode unit 212 may be coupled to instruction cache 214, which stores instructions received from memory 112 via bus interface unit 224 and predecode unit 212. Instruction cache 214 may also contain a predecode cache (not shown) for storing predecode information. Decode unit 220 may receive instructions and predecode information from instruction cache 214 and decode the instructions into component pieces. The component pieces may be forwarded to execution engine 230. The component pieces may be RISC operands. (Microprocessor 110 may be RISC-based superscalar microprocessor). RISC ops are fixed-format internal instructions, jug most of which are executable by microprocessor 10 in a single clock cycle. RISC operations may be combined to form every function of the x86 instruction set.

Execution engine 230 may execute the decoded instructions in response to the component pieces received from decode unit 220. As shown in FIG. 4, execution engine 230 may include a scheduler buffer 232 coupled to receive input from decode unit 220. Scheduler buffer 232 may be configured to convey decoded instructions to a plurality of execution pipelines 236A–236E in accordance with input received from instruction control unit 234. Execution pipelines 236A–236E are representative, and in other embodiments, varying numbers and kinds of pipelines may be included.

Instruction control unit 234 contains the logic necessary to manage out of order execution of instructions stored in scheduler buffer 232. Instruction control unit 34 also manages data forwarding, register renaming, simultaneous issue and retirement of RISC operations, and speculative execution. In one embodiment, scheduler buffer 232 holds up to 24 RISC operations at one time. When possible, instruction control unit 234 may simultaneously issue (from buffer 232) a RISC operation to each available execution unit 236.

Execution pipelines 236A–236E may include load unit 236A, store unit 236B, register X pipeline 236C, register Y pipeline 236D, and floating point unit 236E. Load unit 236A may receive input from data cache 226, while store unit 236B may interface to data cache 226 via a store queue 238. Store unit 236B and load unit 236A may be two-staged pipeline designs. Store unit 236B may perform memory writes. For a memory write operation, the store unit 236B may generate a physical address and the associated data bytes which are to be written to memory. These results (i.e. physical address and data bytes) may be entered into the store queue 238. Memory read data may be supplied by data cache 226 or by an entry in store queue 238 (in the case of a recent store). If the data is supplied by store queue 238, additional execution latency may be avoided.

Register X pipeline 236C and register Y pipeline 236D may each include a combination of integer, integer SIMD (e.g. MMX®), and floating-point SIMD (e.g. 3DNow!™) execution resources. Some of these resources may be shared between the two register pipelines. As suggested by FIG. 3, load unit 236A, store unit 236B, and register pipelines 236C–236D may be coupled to a register file 244 from which these units are configured to read source operands. In addition, load unit 236A and register pipelines 236C–236D may be configured to store destination result values to register file 244. Register file 244 may include physical storage for a set of architected registers.

Floating point unit 236E may also include a register file 242. Register file 242 may include physical storage locations assigned to a set of architected floating point registers. Floating point instructions (e.g. x87 floating point instructions, or IEEE 754/854 compliant floating point instructions) may be executed by floating point unit 236E, which reads source operands from register file 242 and updates destinations within register file 242 as well. Some or all of the registers of register file 244 may be logically mapped (i.e. aliased) onto the floating point registers of register file 242.

Execution pipeline 236E may contain a floating point unit designed to accelerate the performance of software which utilizes the x86 (or x87) floating point instructions. Execution pipeline 236E may include an adder unit, a multiplier unit, and a divide/square root unit, etc. Execution pipeline 236E may operate in a coprocessor-like fashion, in which decode unit 220 directly dispatches the floating point instructions to execute pipeline 236E. The floating point instructions may still be allocated in scheduler buffer 232 to allow for in-order retirement of instructions. Execution pipeline 236E and scheduler buffer 232 may communicate to determine when a floating point instruction is ready for retirement.

FIG. 5 illustrates one embodiment of the execution resources which may be associated with register X pipeline 236C and the register Y pipeline 236D. As shown in FIG. 5, scheduler buffer 232 may be coupled via Register X issue bus 301 to:

(1) scalar integer X ALU (arithmetic logic unit) 310A, (2) SIMI integer ALU 310B, (3) SIMD integer/floating-point multiplier 3 10C, (4) SIMD integer shifter 310D, and (5) SIMD floating-point ALU 310E.

In addition, scheduler buffer 232 may be coupled via Register Y issue bus 302 to:

(3) SIM integer/floating-point multiplier 310C, (4) SIMD integer shifter 310D, (5) SIMD floating-point ALU 310E, (6) SME integer ALU 310F, and (7) scalar integer Y ALU 310G

Scalar integer X ALU 310A and SIMD integer ALU 310B may dedicated to Register X pipeline 236C. Similarly, scalar integer Y ALU 310G and SIMD integer ALU 310F may be dedicated to Register Y pipeline 236D. Therefore, both register pipelines may allow superscalar execution of scalar integer instructions and SIMD integer instructions. SIMD integer/floating-point multiplier 310C, SMD integer shifter 310D and SMI) floating-point ALU 310E may be shared by Register X pipeline 236C and Register Y pipeline 236D.

Scalar Integer X ALU 310A may be configured to perform integer ALU operations, integer multiplications, integer divisions (both signed and unsigned), shifts, and rotations. Scalar Integer Y ALU 310G may be configured to perform basic word and double word ALU operations (e.g. add, or, and, cmp, etc.).

SIMD integer ALU 310B and SIMD integer ALU 310F may be configured to perform addition, subtraction, logical, pack, and unpack operations on packed integer operands. In one embodiment, ALUs 310B and 310F are configured to perform addition, subtraction, logical, pack and unpack operations corresponding to the MMX® instruction set architecture.

SIMD integer/floating-point multiplier 310C may be configured to perform multiply operations on packed floating-point operands or packed integer operands. In one embodiment, multiplier 310C may be configured to perform integer multiply operations corresponding to the MMX®E) instruction set, and floating-point multiply operations corresponding to the 3DNow!™ instruction set.

SIMD floating-point ALU 310E may be configured to perform packed floating-point addition, subtraction, comparison, and integer conversion operations on packed floating-point operands. In one embodiment, ALU 310E may be configured to perform packed floating-point addition, subtraction, comparison, and integer conversion operations corresponding to the 3DNow!™ instruction set.

Any pair of operations which do not require a common resource (execution unit) may be simultaneously executed in the two register pipelines (i.e. one operation per pipeline). For example, a packed floating-point multiply and a packed floating-point addition may be issued and executed simultaneously to units 310C and 310E respectively. However, a packed integer multiply and a packed floating-point multiply could not be issued simultaneously in the embodiment of FIG. 5 without inducing a resource contention (for SIMD integer/floating-point multiplier 310C) and a stall condition. Thus, the maximum rate of execution for the two pipelines taken together is equal to two operations per cycle.

Register file 244 may contain registers which are configured to support packed integer and packed floating-point operations. For example, register file 244 may include registers denoted MM0 through MMn which conform to the 3DNow!™ and MMX(® instruction set architectures. In one embodiment of microprocessor 110, there are eight MM registers, i.e. MM0 through MM7, each having a 64 bit storage capacity. Two 32-bit floating point operands may be loaded into each MM register in a packed format. For example, suppose register MM0 has been loaded with floating-point operands A and B, and register MM1 has been loaded with floating-point operands C and D. In shorthand notation, this situation may be represented by the expressions MM0=[A:B] and MM1=[C:D], where the first argument in a bracketed pair represents the high-order 32 bits of a quadword register, and the second argument represents the low-order 32 bits of the quadword register. The 3DNow!™ instructions invoke parallel floating-point operations on the contents of the MM registers. For example, the 3DNow!™ multiply instruction given by the assembly language construct "pfmul MM0,MM1"

invokes a parallel floating-point multiply on corresponding components of MM0 and MM1. The two floating-point resultant values of the parallel multiply are stored in register MM0. Thus, after the instruction has completed execution, register MM0 may be represented by the expression MM0=[A*C:B*D]. As used herein, the assembly language construct "pfxxx MMdest, MMsrc"

implies that a 3DNow!™ operation corresponding to the mnemonic pfxxx uses registers MMdest and MMsrc as source operands, and register MMdest as a destination operand.

The assembly language construct

"pfadd MM0, MM1"

invokes a parallel floating-point addition on corresponding components of registers MM0 and MM1. Thus, after this instructions has completed execution, register MM0 may be represented by the expression MM0=[A+C:B+D].

It is noted that alternate embodiments of microprocessor 110 are contemplated where the storage capacity of an MM register allows for more than two floating-point operands. For example, an embodiment of microprocessor 110 is contemplated where the MM registers are configured to store four 32-bit floating-point operands. In this case, the MM registers may have a size of 128-bits.

Multimedia applications demand increasing amounts of storage and transmission bandwidth. Thus, multimedia systems use various types of audio/visual compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). The frequency domain characteristics of a picture frame generally allow for easy removal of spatial redundancy and efficient encoding of the frame. One video data compression standard for still graphic images is JPEG (Joint Photographic Experts Group) compression. JPEG compression is actually a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. The difference frames are further compressed by such techniques as the DCT. Examples of video compression which use an interframe compression technique are MPEG (Moving Pictures Experts Group), DVI and Indeo, among others.

MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). This relative encoding is achieved by the process of motion estimation. The difference image as a result of motion compensation is further compressed by means of the DCT, quantization and RLE entropy coding.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

Computation of the discrete cosine transform (DCT) as well as computation of the inverse discrete cosine transform (IDCT) in multimedia systems generally require a large amount of processing. For example, hundreds of multiplication (or division) operations as well as hundreds of addition (or subtraction) operations may be required to perform the DCT or IDCT upon a single 8×8 array. Such computational requirements can be extremely time-consuming and resource intensive.

A new system and method are desired for efficiently computing the forward and/or inverse discrete cosine transform. It is particularly desirable to provide a system for computing the forward and/or inverse discrete cosine transform which reduces computational requirements in a general purpose computer system.

SUMMARY OF THE INVENTION

The problems outlined above are in large part solved by a system and method of a two-dimensional forward and/or inverse discrete cosine transform in accordance with the present invention. In one embodiment, the method comprises: (1) receiving multiple data blocks; (2) grouping together one respective element from each of the multiple data blocks to provide full data vectors for single-instruction-multiple-data (SIMD) floating point instructions; and (3) operating on the full data vectors with SIMD instructions to carry out the two dimensional transform on the multiple data blocks. Preferably the two dimensional transform is carried out by performing a linear transform on each row of the grouped elements, and then performing a linear transform on each column of the grouped elements. The method may further include isolating and arranging the two dimensional transform coefficients to form transform coefficient blocks that correspond to the originally received multiple data blocks. The multiple data blocks may consist of exactly two data blocks. The method may be implemented in the form of software and conveyed on a digital information storage medium or information transmission medium. The dual forward or inverse discrete cosine transform methodology may be employed within a general purpose computer or within a computation unit of a multimedia encoder or decoder system, implemented either in hardware or software. A multimedia encoder or decoder employing the fast, forward or inverse discrete cosine transform methodology in accordance with the present invention may advantageously achieve high performance.

BRIEF DESCRIPTION OF THE DRAWINGS

Other objects and advantages of the invention will become apparent upon reading the following detailed description and upon reference to the accompanying drawings in which:

FIG. 1 shows a comparison of scalar and SIMD multiplications;

FIG. 5 shows one embodiment of execution unit pipelines;

FIG. 6 shows a flowchart of a two-dimensional linear transform method;

FIGS. 7A–7E show data configurations at various points in the flowchart of FIG. 6;

FIGS. 8A–8E show data configurations for an "element parallel" implementation; and FIGS. 9A–9E show data configurations for a "block parallel" implementation.

Figure 2:
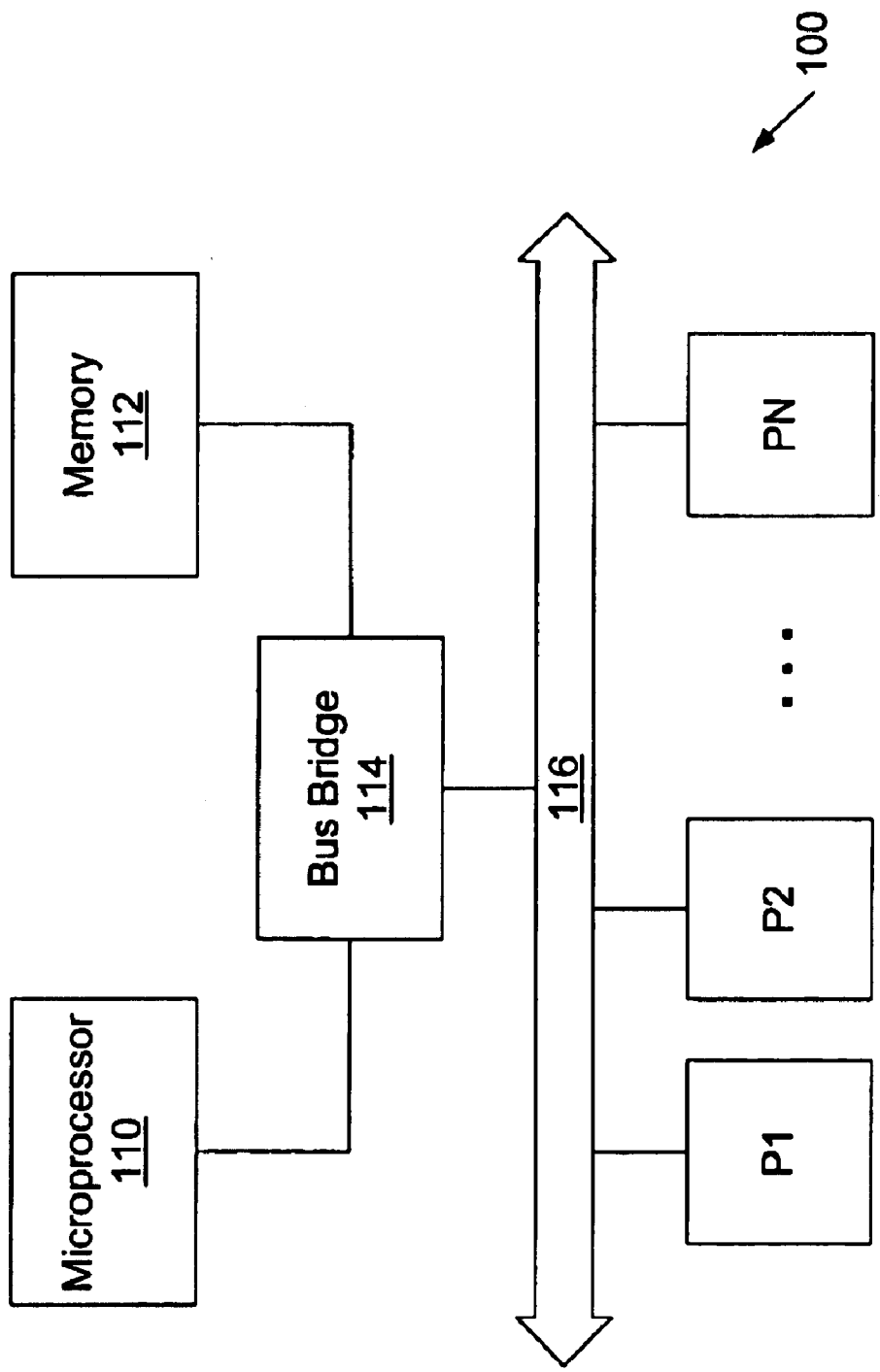
FIG. 2 shows one embodiment of a computer system.
Figure 3:
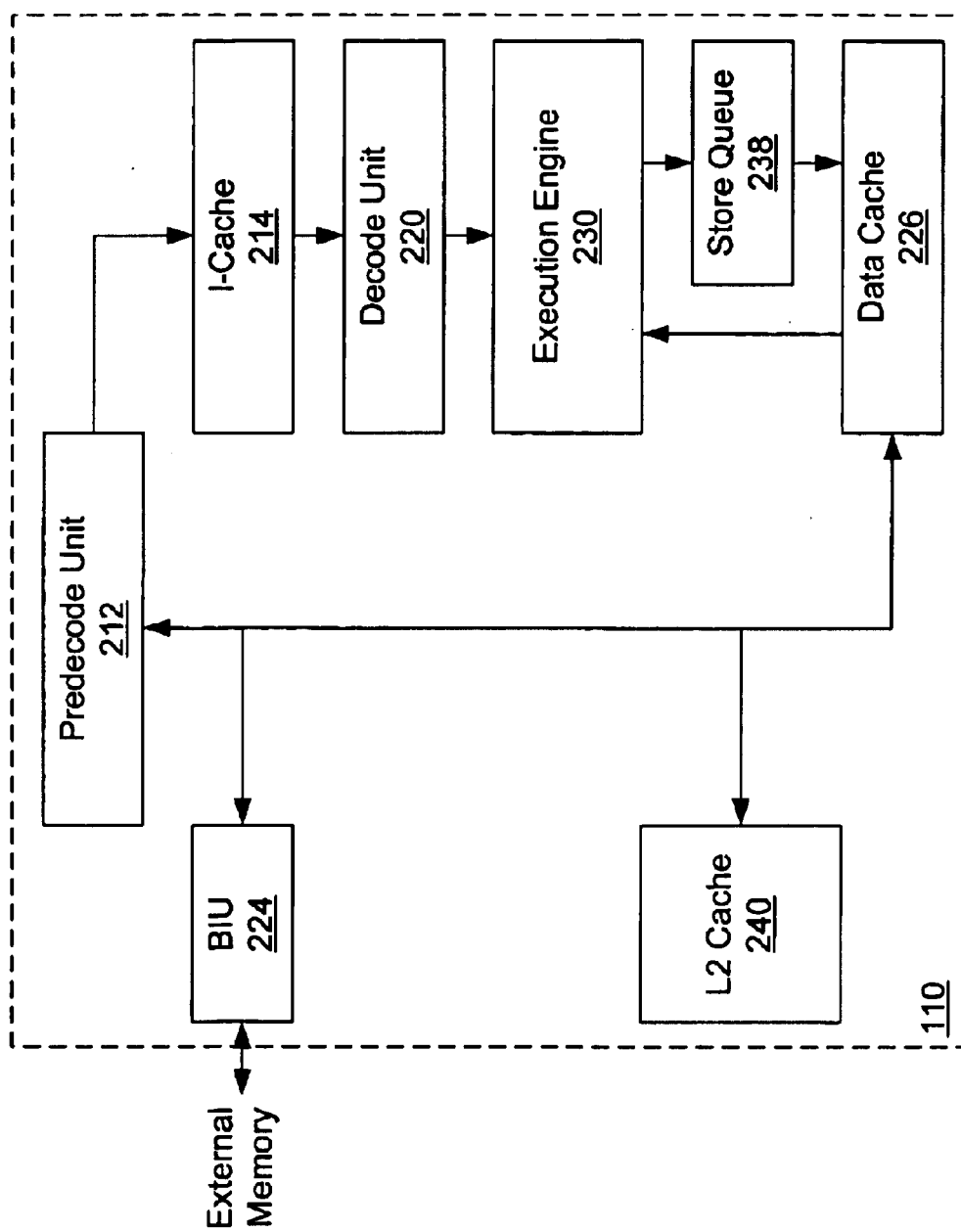
FIG. 3 shows one embodiment of a microprocessor.
Figure 4:
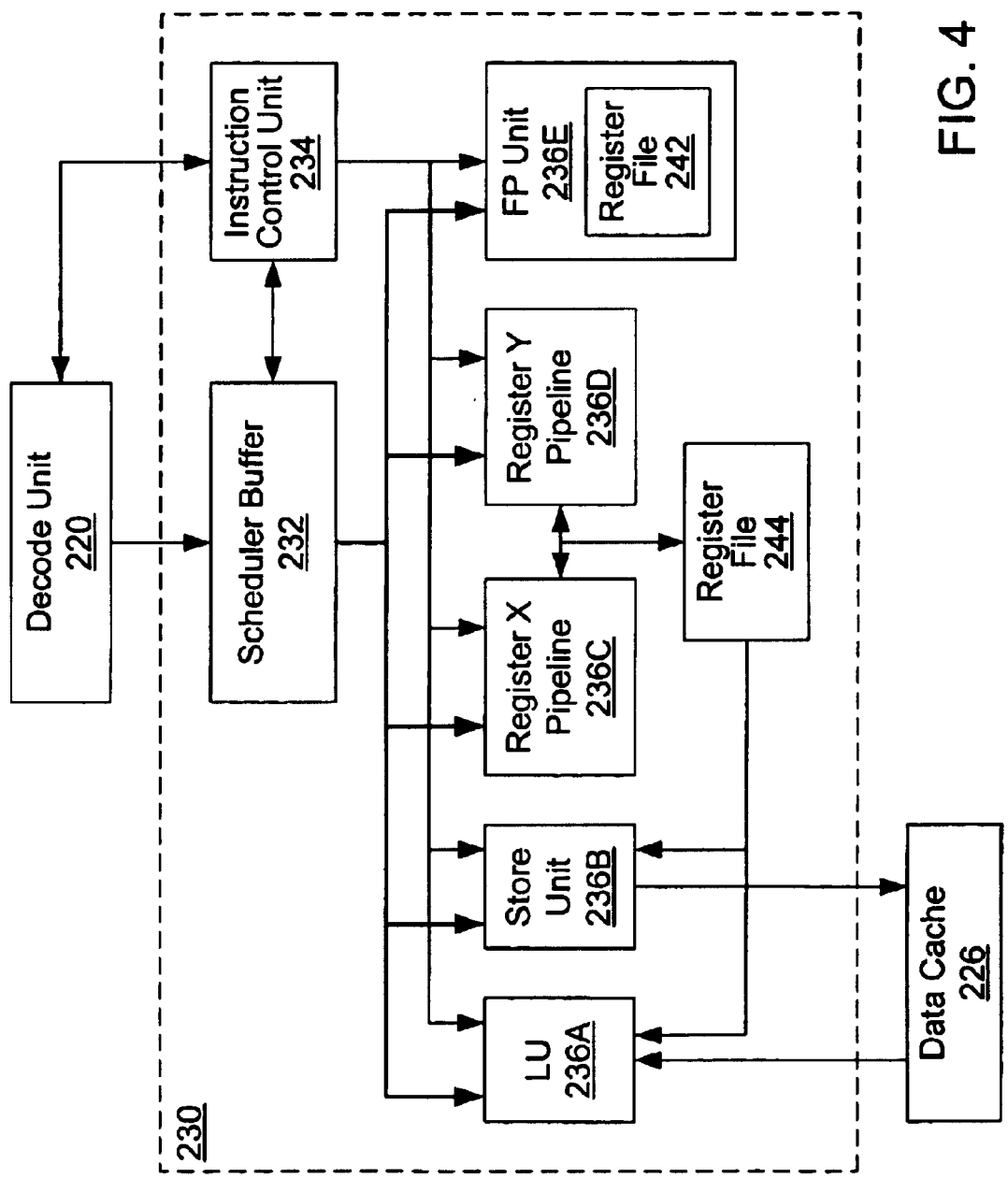
FIG. 4 shows one embodiment of an execution engine within a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

TERMINOLOGY

As used herein, the term multimedia instruction refers to the above described packed integer operations (e.g. operations such as those defined by the MMX instructions within the x86 instruction set). Furthermore, the term multimedia instructions may refer to packed floating point operations optimized for three dimensional graphics calculations and/or physics calculations (e.g. operations such as those defined by the 3DNow! instructions). These instructions may be defined to operate, for-example, on two 32-bit floating point numbers packed into a given multimedia register. Other packed floating point formats may be used as well.

DETAILED DESCRIPTION OF PREFERRED EMBODIMENTS

The DCT and IDCT transforms discussed in the background can be extended to two dimensions. This may be done, for example, on a flat image to identify the spatial frequency components of the image. Typically, the image is expressed in terms of small picture elements, termed pixels, laid out in a rectangular grid and each assigned a single color value. (The color value may be expressed in terms of multiple components such as Red, Green and Blue intensities, but this is easily accounted for by repeating the process disclosed below for each component). To minimize hardware requirements, the image is generally divided into small, square blocks of pixels (e.g. 8×8 pixels forms a block), termed macroblocks, and the two-dimensional transforms are applied to each block separately.

Since the DCT and IDCT transforms are linear, when they are extended to two dimensions the horizontal and vertical transforms can be performed independently and in any order. FIG. 6 shows a flowchart of one method for performing any linear transform in two dimensions. In the ensuing discussion, the method is applied to a two-dimensional block of data having Rmax rows and $C_{max}$ columns. This method will be described with references to FIGS. 7A–7E, where the configuration of data is shown at various points in the flowchart. For clarity in these figures, $R_{max}$ and $C_{max}$ are assumed to equal four. It is noted that eight is a more common circumstance, but this and other values are also contemplated.

It is contemplated that the method of FIG. 6 may take the form of a subroutine. When this subroutine is called, it would be provided with an input block of data such as that shown in FIG. 7A. Data block A has components $A_{RC}$, where index R indicates the row number and index C indicates the column number. In the context of the DCT and IDCT transforms, each component ARC is preferably a 16-bit valued integer.

In FIG. 6, row index R is initialized to 1 in block 602. Blocks 604, 606, and 608 form a loop in which one-by-one, the rows of data block A are individually transformed. In block 604, the transform is performed on the current row as determined by row index R. In block 606, the row index R is compared to $R_{max}$, the number of rows in the data block. If the last row has not yet been transformed, then in block 608 the row index R is incremented and the loop is repeated until each row has been transformed.

As part of the DCT or IDCT transform being performed in block 604, the data block components $A_{RC}$ are loaded into processor registers and preferably converted to 32-bit floating point numbers (indicated by the expanded width of the components in FIG. 7B). It is expected that performing the transform using single-precision floating point operations will provide greater accuracy than that obtainable using integer operations. As each row is transformed, the row-transform components, denoted $A_{RC}'$, are stored in a intermediate result buffer as shown by FIG. 7C.

Returning to FIG. 6, after all the rows have been transformed, column index C is initialized to 1 in block 610. Blocks 612, 614, and 616 form a second loop in which one-by-one, the columns of the intermediate result buffer are individually transformed. In block 612, the transform is performed on the current column as indicated by the column index C. In block 614, the column index C is compared to $C_{max}$, the number of columns in the data block. If the last column has not yet been transformed, then in block 616 the column index is incremented and the loop is repeated until each column has been transformed.

When the transform in block 612 is the subject DCT or IDCT transform, the operations are preferably performed using floating point operations. To this end, the intermediate result buffer shown in FIG. 7C preferably stores the row-transform components $A_{RC}'$ in floating point form to avoid extra conversions between integer and floating point form. As the row-transform components are loaded into processor registers one column at a time, no conversion is necessary. After the column transform, the now-two-dimensional transform components $A_{RC}''$ are preferably converted to 16-bit integer form and sent to an output buffer as shown in FIG. 7E. After the column transforms are completed, the 2D-transform data block is returned from the subroutine.

It is noted that upon study of the method of FIG. 6, several variations will become apparent to one of ordinary skill in the art. For example, the column transforms may be performed before the row transforms. The rows may be transformed in any order, as may the columns. The intermediate result buffer may be written in column order and accessed in row order rather than written in row order and accessed in column order. The description of FIG. 6 is not intended to exclude such variations.

It is noted that for explanation clarity, the method of FIG. 6 was described without reference to parallel execution. Parallel execution of the transform offers the potential for much faster completion. It is believed that there may exist an infinite number of ways to perform parallel execution of the described transform, but they are not all equivalent. To illustrate this point, two parallel execution methods are now described. The first is what might be termed an "element parallel" method. The second, improved method might be termed a "block parallel" method.

In both methods, the parallelism is obtained through the use of 3DNow!™ instructions such as the pfmul instruction which invokes a parallel floating-point multiply on corresponding components of the operand registers. When the operands are 64-bit registers each holding two 32-bit floating point numbers, this instruction causes the product of the first two numbers to be evaluated in parallel with the product of the second two numbers, thereby doubling the number of operations performed in a given instant. To maximize the advantages offered by this parallelism built in to the processor, it is necessary to minimize the number of operations required to put the data in the correct form for these instructions.

FIGS. 8A–8E correspond to the flowchart of FIG. 6 in the same way as FIGS. 7A–7E. In FIGS. 8A–8E, heavy lines have been added to the data configuration to show the 64-bit boundaries. The 64-bit boundaries are relevant because that is the size of the processor registers. If the data is correctly configured within a 64-bit boundary, the data may be moved between memory and the processor registers with minimal latency.

The initial data block is assumed to be packed 16-bit integers as shown in FIG. 8A. The first two elements of a given row can be placed into a processor register and converted to floating point format in four operations. For example,

| movq | mm1, [InputBfr] | ;put element 11 in register 1 |
| movq | mm2, [InputBfr+2] | ;put element 12 in register 2 |
| punpckldq | mm2, mm1 | ;put element 11&12 into reg 2 |
| pi2fw | mm1, mm2 | ;convert 11&12 to floating pt |

Repeating this process with the second two elements of a given row will produce the register arrangement shown in FIG. 8B. With this register arrangement, transform operations may be performed in parallel. To keep the latency to a minimum on writing to the intermediate result buffer, the transform components are transferred together from the registers to produce the configuration shown in FIG. 8C.

Unfortunately, the minimum latency cannot be obtained when retrieving data from the intermediate buffer. Additional manipulation is necessary to go from a row arrangement to a column arrangement. The first two elements of a column can be placed into a processor register in three operations, as can the second two elements. This results in the configuration of FIG. 8D. Ultimately the results must be converted back to integer form and written to the output buffer as shown in FIG. 8E.

In video encoding/decoding and other forms of multimedia operations, the DCT and IDCT operations are performed many million times or more per second, so that the elimination of even a few transform operations results in a detectable performance improvement. It is noted here that the re-arrangement of register data configurations between the row transforms and the column transforms can be avoided, and that this will result in a savings of at least 64 operations when performing a 2D transform on an 8×8 block of data.

FIGS. 9A–9E show a data configuration that achieves this goal. When subroutine of FIG. 6 is called, it is provided with two data blocks as shown in FIG. 9A. Then, as the transform of one block is taken, the parallel operations allow the second block "to come along for the ride", i.e. to be transformed with a minimal number of additional operations. As shown in FIG. 9B, each processor register used is configured with corresponding data elements from each data block. For example, the first register shown in FIG. 9B has the first element of the current row from both data blocks.

Once the row transform has been performed, the register contents are transferred as a unit to the intermediate results buffer as shown in FIG. 9C. They can be retrieved in the same way, as seen in FIG. 9D, so that only one operation per register is necessary to store and retrieve the intermediate results. No extra manipulation is necessary to prepare for the column transforms.

The process is concluded by converting the register contents to 16-bit integers and writing them to the respective output buffers as shown in FIG. 9E. This may be accomplished with 6 operations. For example:

```
pf2id  mm1,              mm1      ;convert A11&B11 to integer
movd   eax,              mm1      ;copy B11 to temp register
mov    word ptr [OutBfr2], ax     ;write B11 to block 2 output
psrlq  mm1,              32       ;move A11 to low end of register
movd   eax,              mm1      ;copy A11 to temp register
mov    word ptr [OutBfr1], ax     ;write A11 to block 1 output
```

The following listing presents a two-dimensional DCT transform on dual 8×8 blocks of 16-bit-valued pixels, and one that similarly performs the inverse DCT transform. These programs use the block-parallel computation methods described herein that advantageously exploit the structure and instruction set of modern processors to achieve a significantly improved performance relative to element-parallel computations.

APPENDIX

```
static const __int64       DW17=0x3ec9234b3ec9234b,
                           AW17=0x3f1683173f168317,
                           DW26=0x3e8a8bd63e8a8bd6,
                           AW26=0X3f273d753f273d75,
                           DW35=0x3e0d42b03e0d42b0,
                           AW35=0x3f318a853f318a85;
static const __int64       FW0=0x3f3504f43f3504f4,
                           FW1=0x3efb14bd3efb14bd,
                           FW2=0x3eec83603eec8360,
                           FW3=0x3ed4db313ed4db31,
                           FW4=0x3eb504f43eb504f4,
                           FW5=0x3e8e39d93e8e39d9,
                           FW6=0x3e43ef143e43ef14,
                           FW7=0x3dc7csc73dc7c5c7;
```

-continued

APPENDIX

```
int F3DNowIDCTDual(short *inbuf1, short
    *inbuf2, short *outbuf1, short *outbuf2)
{
float    tmpbut[128], *dptr;
short    *inptr1, *outptr1, *inptr2, *outptr2;
__int64  tmp1, tmp2;
/* Horizontal transform */
dptr = tmpbuf;
inptr1 = inbuf1;
inptr2 = inbuf2;
outptr1 = outbuf1;
outptr2 = outbuf2;
asm {
                              Horizontal IDCT
    mov       ecx,            8;
    mov       esi,            inptr1;
    mov       ebx,            inptr2;
    mov       edi,            dptr;
lb1:
/* first stage */
// x4 = (float)bk[1], x5 = (float)blk[7];
    movq      mm4,            [ebx+2];
    movq      mm1,            [esi+2];
    punpckldq mm1,            mm4;
    pi2fw     mm4,            mm1;
    movq      mm5,            [ebx+14];
    movq      mm6,            [esi+14];
    punpckldq mm6,            mm5;
    pi2fw     mm5,            mm6;
//x0=W7*(x4+x5),x4=x0+DW17*x4,x5=x0-W17*x5;
    movq      mm0,            mm4;
    movq      mm1,            FW7
    pfadd     mm0,            mm5;
    pfmul     mm0,            mm1; x0 = W7*(x4+x5)
    movq      mm1,            DW17
    pfmul     mm4,            mm1; x4 = x0+DW17*x4,
    pfadd     mm4,            mm0;
    movq      mm1,            AW17
    pfmul     mm5,            mm1; x5 = x0-AW17*x5
    pfsub     mm0,            mm5;
    movq      mm5,            mm0;
// x6 = (float)blk[5], x7 = (float)blk[3];
    movq      mm6,            [ebx+10];
    movq      mm7,            [esi+10];
    punpckldq mm7,            mm6;
    pi2fw     mm6,            mm7;
    movq      mm7,            [ebx+6];
    movq      mm1,            [esi+6];
    punpckldq mm1,            mm7;
    pi2fw     mm7,            mm1;
//x1=W3*(x6+x7),x6=x1-DW35*x6,
//x7=x1-AW35*x7;
    movq      mm1,            mm6;
    pfadd     mm1,            mm7;
    movq      mm0,            FW3
    pfmul     mm1,            mm0; x1 = W3*(x6+x7)
    movq      mm0,            mm1
    movq      mm2,            DW35
    pfmul     mm6,            mm2; x6 x1-DW35*x6,
    pfsub     mm0,            mm6;
    movq      mm6,            mm0
    movq      mm2,            AW35
    pfmul     mm7,            mm2; x7 = x1-AW35*x7
    pfsub     mm1,            mm7;
    movq      mm7,            mm1;
/* second stage */
// x0 = (float)blk[0], x1 = (float)blk[4];
    movq      mm0,            [ebx];
    movq      mm1,            [esi];
    punpckldq mm1,            mm0;
    pi2fw     mm0,            mm1;
    movq      mm1,            [ebx+8];
    movq      mm2,            [esi+8];
    punpckldq mm2,            mm1;
    pi2fw     mm1,            mm2;
```

-continued

APPENDIX

```
// x8 = (x0+x1)*W4; x0 = (x0-x1)*W4;
    movq        mm2,           mm0;
    pfadd       mm2,           mm1;
    movq        mm3,           FW4;
    pfmul       mm2,           mm3;
    movq        tmp1,          mm2;
    pfsub       mm0,           mm1;
    movq        mm2,           FW4
    pfmul       mm0,           mm2;
// x3 = (float)blk[2], x2 = (float)blk[6];
    movq        mm3,           [ebx+4];
    movq        mm2,           [esi+4];
    punpckldq   mm2,           mm3;
    pi2fw       mm3,           mm2;
    movq        mm2,           [ebx+12];
    movq        mm1,           [esi+12];
    punpckldq   mm1,           mm2;
    pi2fw       mm2,           mm1;
    movq        tmp2,          mm0
//x1=W6*(x3 + x2),x2=x1-AW26*x2,
//x3=x1+DW26*x3;
    movq        mm1,           mm3;
    pfadd       mm1,           mm2;
    movq        mm0,           FW6
    pfmul       mm1,           mm0; x1 = W6*(x3+x2)
    movq        mm2,           AW26
    pfmul       mm2,           mm0; x2 = x1-AW26*x2,
    movq        mm0,           mm1
    pfsub       mm0,           mm2;
    movq        mm2,           mm0
    movq        mm0,           DW26
    pfmul       mm3,           mm0; x3 = x1+DW26*x3
    pfadd       mm1,           mm3;
    movq        mm3,           mm1;
    movq        mm0,           tmp2
// x1 =x4 + x6;x4 -= x6; x6 = x5 + x7;x5 - =x7;
    movq        mm1,           mm4;
    pfadd       mm1,           mm6;
    pfsub       mm4,           mm6;
    movq        mm6,           mm5;
    pfadd       mm6,           mm7;
    pfsub       mm5,           mm7;
/* third stage */
    movq        tmp2,          mm5;
// x7 = x8 + x3; x5 -= x3;
    movq        mm7,           tmp1;
    movq        mm5,           mm7;
    pfadd       mm7,           mm3;
    pfsub       mm5,           mm3;
// x3 = x0 + x2; x0 -= x2;
    movq        mm3,           mm0;
    pfadd       mm3,           mm2;
    pfsub       mm0,           mm2;
    movq        tmp1,          mm0; // backup mm0
// x2 = (x4 + x5)*W0;
    movq        mm2,           mm4;
    pfadd       mm2,           tmp2;
    movq        mm0,           FW0
    pfmul       mm2,           mm0;
// x4 = (x4 - x5)*W0;
    pfsub       mm4,           tmp2;
    pfmul       mm4,           mm0;
/******** Fourth stage: store results *******/
// tmpptr[0] = (x7 + x1);
    movq        mm0,           mm1
    pfadd       mm0,           mm7
    movq        [edi],         mm0
// tmpptr[7] = (x7 - x1);
    pfsub       mm7,           mm1
    movq        [edi+56],      mm7
// Free mm1 and mm7, return mmo
    movq        mm0,           tmp1
// tmpptr[1] = (x3 + x2);
    movq        mm1,           mm3
    pfadd       mm1,           mm2
    movq        [edi+8],       mm1
// tmpptr[6] = (x3 - x2);
    pfsub       mm3,           mm2
    movq        [edi+48],      mm3
// tmpptr[2] = (x0 + x4);
    movq        mm1,           mm0
    pfadd       mm1,           mm4
    movq        [edi+16],      mm1
// tmpptr[5] = (x0 - x4);
    pfsub       mm0,           mm4
    movq        [edi+40],      mm0
// tmpptr[3] = (x5 + x6);
    movq        mm1,           mm5
    pfadd       mm1,           mm6
    movq        [edi+24],      mm1
// tmpptr[4] = (x5 - x6);
    pfsub       mm5,           mm6
    movq        [edi+32],      mm5
    add         edi,           64;
    add         esi,           16;
    add         ebx,           16;
    dec         ecx
    jnz         lb1
                               Vertical IDCT
    mov         ecx,           8;
    mov         esi,           dptr;
    mov         edi,           outptr1;
    mov         ebx,           outptr2;
lb2:
/* first stage */
// x4 = tmpptr[8], x5 = tmpptr[56];
    movq        mm4,           [esi+64];
    movq        mm5,           [esi+448];
//x0=W7*(x4+x5),x4=x0+DW17*x4,
//x5=x0-AW17*x5;
    movq        mm0,           mm4;
    movq        mm1,           FW7
    pfadd       mm0,           mm5;
    pfmul       mm0,           mm1; x0 = W7*(x4+x5)
    movq        mm1,           DW17
    pfmul       mm4,           mm1; x4 = x0+DW17*x4,
    pfadd       mm4,           mm0;
    movq        mm1,           AW17
    pfmul       mm5,           mm1; x5 = x0-AW17*x5
    pfsub       mm0,           mm5;
    movq        mm5,           mm0;
// x6 = tmpptr[40], x7 = tmpptr[24];
    movq        mm6,           [esi+320];
    movq        mm7,           [esi+192];
//x1=W3*(x6+x7),x6=x1 DW35*x6,
//x7=x1-AW35*x7;
    movq        mm1,           mm6;
    pfadd       mm1,           mm7;
    movq        mm0,           FW3
    pfmul       mm1,           mm0 ; x1 = W3*(x6+x7)
    movq        mm0,           mm1
    movq        mm2,           DW35
    pfmul       mm6,           mm2; x6 = x1-DW35*x6,
    pfsub       mm0,           mm6;
    movq        mm6,           mm0
    movq        mm2,           AW35
    pfmul       mm7,           mm2; x7 = x1-AW35*x7
    pfsub       mm1,           mm7;
    movq        mm7,           mm1;
/* second stage */
// x0 = tmpptr[0], x1 = tmpptr[32];
    movq        mm0,           [esi];
    movq        mm1,           [esi+256);
// x8 = (x0+x1)*W4; x0 = (x0-x1)*W4;
    movq        mm2,           mm0;
    pfadd       mm2,           mm1;
    movq        mm3,           FW4;
    pfmul       mm2,           mm3;
    movq        tmp1,          mm2;
    pfsub       mm0,           mm1;
    movq        mm2,           FW4
    pfmul       mm0,           mm2;
// x3 = tmpptr[16], x2 = tmpptr[48];
    movq        mm3,           [esi+128];
```

APPENDIX

```
        movq      mm2,            [esi+384];
        movq      tmp2,           mm0
//x1=W6*(x3+x2),x2=x1-AW26*x2,
//x3=x1+DW26*x3;
        movq      mm1,            mm3;
        pfadd     mm1,            mm2;
        movq      mm0,            FW6
        pfmul     mm1,            mm0 ; x1 = W6*(x3+x2)
        movq      mm0,            AW26
        pfmul     mm2,            mm0; x2 = x1-AW26*x2,
        movq      mm0,            mm1
        pfsub     mm0,            mm2;
        movq      mm2,            mm0
        movq      mm0,            DW26
        pfmul     mm3,            mm0; x3 = x1+DW26*x3
        pfadd     mm1,            mm3;
        movq      mm3,            mm1
        movq      mm0,            tmp2
// x1 = x4 + x6;x4 -= x6;x6 = x5 + x7;x5 -= x7;
        movq      mm1,            mm4;
        pfadd     mm1,            mm6;
        pfsub     mm4,            mm6;
        movq      mm6,            mm5;
        pfadd     mm6,            mm7;
        pfsub     mm5,            mm7;
/* third stage */
        movq      tmp2,           mm5;
// x7 = x8 + x3;x5 -= x3;
        movq      mm7,            tmp1;
        movq      mm5,            mm7;
        pfadd     mm7,            mm3;
        pfsub     mm5,            mm3;
// x3 = x0 + x2; x0 -= x2;
        movq      mm3,            mm0;
        pfadd     mm3,            mm2;
        pfsub     mm0,            mm2;
        movq      tmp1,           mm0;// backup mm0
// x2 = (x4 + x5)*W0;
        movq      mm2,            mm4;
        pfadd     mm2,            tmp2;
        movq      mm0,            FW0
        pfmul     mm2,            mm0,
// x4 = (x4 - x5)*W0;
        pfsub     mm4,            tmp2;
        pfmul     mm4,            mm0;
/* Fourth stage: store results */
// tmpptr[0] = (x7 + x1);
        movq      mm0,            mm1
        pfadd     mm0,            mm7
        pf2id     mm0,            mm0
        movd      eax,            mm0
        mov       word ptr [edi], ax
        psrlq     mm0,            32
        movd      eax,            mm0
        mov       word ptr [ebx], ax
// tmpptr[56] = (x7 - x1);
        pfsub     mm7,            mm1;
        pf2id     mm7,            mm7
        movd      eax,            mm7;
        mov       word ptr [edi+112], ax;
        psrlq     mm7,            32
        movd      eax,            mm7
        mov       word ptr [ebx+112], ax
// Free mm1 and mm7, return mmo
        movq      mm0,            tmp1;
// tmpptr[8] = (x3 + x2);
        movq      mm1,            mm3;
        pfadd     mm1,            mm2;
        pf2id     mm1,            mm1
        movd      eax,            mm1
        mov       word ptr [edi+16], ax;
        psrlq     mm1,            32
        movd      eax,            mm1
        mov       word ptr [ebx+16], ax
// tmpptr[48] = (x3 - x2);
        pfsub     mm3,            mm2,
        pf2id     mm3,            mm3,
        movd      eax,            mm3;
        mov       word ptr [edi+96], ax;
        psrlq     mm3,            32
        movd      eax,            mm3
        mov       word ptr [ebx+96], ax
// tmpptr[16] = (x0 + x4);
        movq      mm1,            mm0;
        pfadd     mm1,            mm4;
        pf2id     mm1,            mm1;
        movd      eax,            mm1
        mov       word ptr [edi+32], ax;
        psrlq     mm1,            32
        movd      eax,            mm1
        mov       word ptr [ebx+32], ax
// tmpptr[40] = (x0 - x4);
        pfsub     mm0,            mm4;
        pf2id     mm0,            mm0;
        movd      eax,            mm0
        mov       word ptr [edi+80], ax;
        psrlq     mm0,            32
        movd      eax,            mm0
        mov       word ptr [ebx+80], ax
// tmpptr[84] = (x5 + x6);
        movq      mm1,            mm5;
        pfadd     mm1,            mm6;
        pf2id     mm1,            mm1
        movd      eax,            mm1
        mov       word ptr [edi+48], ax;
        psrlq     mm1,            32
        movd      eax,            mm1
        mov       word ptr [ebx+48], ax
// tmpptr[32] = (x5 - x6);
        pfsub     mm5,            mm6;
        pf2id     mm5,            mm5;
        movd      eax,            mm5;
        mov       word ptr [edi+64], ax;
        psrlq     mm5,            32
        movd      eax,            mm5
        mov       word ptr [ebx+64], ax
        add       edi,            2;
        add       ebx,            2;
        add       esi,            8;
        dec       ecx
        jnz       lb2
        femms
        }
        return 0;
}
int F3DNowDctDual(short* coeff1, short *coeff2, short *block1, short *block2)
{
        float tmpbuf[128];
        register float *dptr;
        short *coeffptr1;
        short *coeffptr2;
        short *blkptr1, *blkptr2;
        __int64 tmp1, tmp2;
        /* Horizontal transform */
        dptr = tmpbuf;
        coeffptr1 = coeff1;
        coeffptr2 = coeff2;
        blkptr1 = block1;
        blkptr2 = block2;
        __asm {
        /* Horizontal DCT */
        mov       ecx,            8;
        mov       esi,            blkptr1;
        mov       ebx,            blkptr2;
        mov       edi,            dptr;
lb1:
        movq      mm7,            [esi];
        movq      mm1,            [esi];
        punpckldq mm1,            mm7;
        pi2fw     mm7,            mm1;
        movq      mm1,            [ebx+14];
        movq      mm6,            [esi+14];
        punpckldq mm6,            mm1;
```

APPENDIX

```
        pi2fw     mm1,        mm6;
// b0 = b1 + b7, b7 = b7−b1;
        movq      mm0,        mm1;
        pfadd     mm0,        mm7;
        pfsub     mm7,        mm1;
        movq      mm6,        [ebx+2];
        movq      mm5,        [esi+2];
        punpckldq mm5,        mm6;
        pi2fw     mm6,        mm5;
        movq      mm5,        [ebx+12];
        movq      mm3,        [esi+12];
        punpckldq mm3,        mm5;
        pi2fw     mm5,        mm3;
//b2 = b5+b6, b6 = b6−b5;
        movq      mm2,        mm5;
        pfadd     mm2,        mm6;
        pfsub     mm6,        mm5;
        movq      mm5,        [ebx+4];
        movq      mm3,        [esi+4];
        punpckldq mm3,        mm5;
        pi2fw     mm5,        mm3;
        movq      mm3,        [ebx+10];
        movq      mm4,        [esi+10];
        punpckldq mm4,        mm3;
        pi2fw     mm3,        mm4;
// b1 = b3+b5, b5 = b5−b3;
        movq      mm1,        mm3;
        pfadd     mm1,        mm5;
        pfsub     mm5,        mm3;
        movq      mm3,        [ebx+8);
        movq      mm4,        [esi+8);
        punpckldq mm4,        mm3;
        pi2fw     mm3,        mm4;
        movq      tmp1,       mm3;
        movq      mm4,        [ebx+6];
        movq      mm3,        [esi+6];
        punpckldq mm3,        mm4;
        pi2fw     mm4,        mm3;
// b3 = b3+b4, b4 = b4−tmp;
        movq      mm3,        tmp1;
        pfadd     mm3,        mm4;
        pfsub     mm4,        tmp1;
        movq      tmp1,       mm0;
        movq      tmp2,       mm3;
// b1 = b1+b2, b2 = b2−b0;
        movq      mm0,        mm1;
        pfadd     mm1,        mm2;
        pfsub     mm2,        mm0;
// b5 = (b5−b6)*IW0, b6 = (b6+b0)*IW0;
        movq      mm0,        mm5;
        movq      mm3,        FW0;
        pfsub     mm5,        mm6;
        pfmul     mm5,        mm3;
        pfadd     mm6,        mm0;
        pfmul     mm6,        mm3;
// b4 = b4−b5, b5 = b0+b5;
        movq      mm0,        mm4;
        pfsub     mm4,        mm5;
        pfadd     mm5,        mm0;
// b7 = b7+b6, b6 = b6−b7;
        movq      mm0,        mm7;
        pfadd     mm7,        mm6;
        pfsub     mm6,        mm0;
// b0 = b3+tmp, b3 = b3−tmp;
        movq      mm3,        tmp2;
        movq      mm0,        mm3;
        pfsub     mm3,        tmp1;
        pfadd     mm0,        tmp1,
// store mm5 and mm6
        movq      tmp1,       mm5;
        movq      tmp2,       mm6;
        movq      mm5,        mm1;
        movq      mm6,        FW4;;// store FW4
        pfadd     mm1,        mm0;// b0 + b1
        pfmul     mm1,        mm6;//[edi = (b0+b1)*IW4;
        movq      [edi],      mm1
        pfsub     mm0,        mm5;// b0−b1
        pfmul     mm0,        mm6;//[edi+32]=(b0−b1)*IW4;
        movq      [edi+256],  mm0
// mm0 and mm1 free
        movq      mm5,        FW1;// store FW1
        movq      mm6,        FW7;// store FW7
        movq      mm0,        mm7;
        movq      mm1,        mm4
        pfmul     mm7,        mm5;// b7*IW1
        pfmul     mm4,        mm6;// b4*IW7
        pfadd     mm7,        mm4;// [edi+8] =
                                  b7*IW1+b4*IW7;
        movq      [edi+64],   mm7
        movq      mm7,        mm0;
        movq      mm4,        mm1;
        pfmul     mm7,        mm6;// b7*IW7
        pfmul     mm4,        mm5;// b4*IW1
        pfsub     mm4,        mm7;//[edi+56]=−b4*IW1+b7*IW7;
        movq      [edi+448],  mm7
// mm4 and mm7 free
// backup mm5 and mm6
        movq      mm5,        tmp1;
        movq      mm6,        tmp2;
        movq      mm4,        FW2;// store FW2
        movq      mm7,        FW6;// store FW6
        movq      mm0,        mm3;
        movq      mm1,        mm2;
        pfmul     mm3,        mm4, // b3*1W2
        pfmul     mm2,        mm7; // b2*1W6
        pfsub     mm2,        mm3;//[edi+16]=−b3*IW2+b2*IW6;
        movq      [edi+128],  mm2
        movq      mm3,        mm0;
        movq      mm2,        mm1;
        pfmul     mm3,        mm7; // b3*IW6
        pfmul     mm2,        mm4;// b2*IW2
        pfadd     mm2,        mm3;
        pxor      mm3,        mm3
        pfsub     mm3,        mm2 // [edi+56]= b2*IW2−b3*IW6;
        movq      [edi+384],  mm3
        movq      mm4,        FW5; // store FW5
        movq      mm7,        FW3; // store FW3
        movq      mm0,        mm5;
        movq      mm1,        mm6;
        pfmul     mm5,        mm4;
        pfmul     mm6,        mm7;
        pfadd     mm5,        mm6;
        pxor      mm6,        mm6
        pfsub     mm6,        mm5 //[edi+24]=−b5*IW5−b6*IW3;
        movq      [edi+192],  mm6
        movq      mm5,        mm0;
        movq      mm6,        mm1;
        pfmul     mm5,        mm7;
        pfmul     mm6,        mm4;
        pfsub     mm5,        mm6; // [edi+40]= b5*IW3−b6*IW5;
        movq      [edi+320],  mm5
        add       esi,        16 ; move to comp row 1
        add       ebx,        16
        add       edi,        8
        dec       ecx;
        jnz       lb1;
Vertical DCT
        mov       ecx,        8;
        mov       esi,        dptr;
        mov       edi,        coeffptr1;
        mov       ebx,        coeffptr2;
loop2:
        movq      mm7,        [esi];
        movq      mm1,        [esi+56];
// b0 = b1+b7, b7 = b7−b1;
        movq      mm0,        mm1;
        pfadd     mm0,        mm7;
        pfsub     mm7,        mm1;
        movq      mm6,        [esi+8];
        movq      mm5,        [esi+48];
// b2 = b5+b6, b6 = b6−b5;
        movq      mm2,        mm5;
        pfadd     mm2,        mm6;
        pfsub     mm6,        mm5;
```

-continued

APPENDIX

```
        movq    mm5,        [esi+16];
        movq    mm3,        [esi+40];
// b1 = b3+b5, b5 = b5-b3;
        movq    mm1,        mm3;
        pfadd   mm1,        mm5;
        pfsub   mm5,        mm3;
        movq    mm4,        [esi+24];
        movq    mm3,        [esi+32];
// b3 = b3+b4, b4 = b4-tmp;
        movq    tmp1,       mm3;
        pfadd   mm3,        mm4;
        pfsub   mm4,        tmp1;
        movq    tmp1,       mm0;
        movq    tmp2,       mm3;
// b1 =b1+b2,b2=b2-b0;
        movq    mm0,        mm1;
        pfadd   mm1,        mm2;
        pfsub   mm2,        mm0;
b5 = (b5-b6)*IW0, b6 = (b6+b0)*IW0;
        movq    mm0,        mm5;
        movq    mm3,        FW0;
        pfsub   mm5,        mm6;
        pfmul   mm5,        mm3;
        pfadd   mm6,        mm0;
        pfmul   mm6,        mm3;
// b4 = b4-b5, b5 = b0+b5;
        movq    mm0,        mm4;
        pfsub   mm4,        mm5;
        pfadd   mm5,        mm0;
// b7 = b7+b6, b6 = b6-b7;
        movq    mm0,        mm7;
        pfadd   mm7,        mm6;
        pfsub   mm6,        mm0;
// b0 = b3+tmp, b3 = b3-tmp;
        movq    mm3,        tmp2;
        movq    mm0,        mm3;
        pfsub   mm3,        tmp1;
        pfadd   mm0,        tmp1;
// store mm5 and mm6
        movq    tmp1,       mm5;
        movq    tmp2,       mm6;
        movq    mm5,        mm1;
        movq    mm6,        FW4; ; // Store FW4
        pfadd   mm1,        mm0; // b0+b1
        pfmul   mm1,        mm6; // [edi]= (b0+b1)*IW4;
        pfsub   mm0,        mm5; // b0-b1
        pfmul   mm0,        mm6;//[edi+256]=(b0-b1)*IW4;
        pf2id   mm5,        mm1;
        pf2id   mm6,        mm0;
        movd    eax,        mm5;
        mov     word ptr [edi],     ax;
        psrlq   mm5,        32;
        movd    eax,        mm5;
        mov     word ptr [ebx],     ax;
// movd    [edi+128],  mm5;
        movd    eax,        mm6;
        mov     word ptr [edi+64],  ax;
// movd    [edi+64],   mm6;
        psrlq   mm6,        32;
        movd    eax,        mm6;
        mov     word ptr [ebx+64],  ax;
// movd    [edi+192],  mm6;
// mm0 and mm1 free
        movq    mm5,        FW1; // store FW1
        movq    mm6,        FW7; // store FW7
        movq    mm0,        mm7;
        movq    mm1,        mm4
        pfmul   mm7,        mm5; // b7*IW1
        pfmul   mm4,        mm6; // b4*IW7
        pfadd   mm7,        mm4;//[edi+8]=b7*IW1+b4*IW7;
        pf2id   mm7,        mm7
        movd    eax,        mm7;
        mov     word ptr [edi+16],  ax;
// movd    [edi+16],   mm7
        psrlq   mm7,        32;
        movd    eax,        mm7;
        mov     word ptr [ebx+16],  ax;
// movd    [edi+144],  mm7;
        movq    mm7,        mm0;
        movq    mm4,        mm1;
        pfmul   mm7,        mm6; // b7*IW7
        pfmul   mm4,        mm5; // b4*IW1
        pfsub   mm7,        mm4;//[edi+448]=-b4*IW1+b7*IW7;
        pf2id   mm7,        mm7;
        movd    eax,        mm7;
        mov     word ptr [edi+112], ax;
// movd    [edi+112],  mm7
        psrlq   mm7,        32;
        movd    eax,        mm7;
        mov     word ptr [ebx+112], ax;
// movd    [edi+240],  mm7;
// mm4 and mm7 free
// backup mm5 and mm6
        movq    mm5,        tmp1;
        movq    mm6,        tmp2;
        movq    mm4,        FW2; // store FW2
        movq    mm7,        FW6; // store FW6
        movq    mm0,        mm3;
        movq    mm1,        mm2;
        pfmul   mm3,        mm4; // b3*IW2
        pfmul   mm2,        mm7; // b2*IW6
        pfsub   mm2,        mm3;//[edi+128]=-b3*IW2+b2*IW6;
        pf2id   mm2,        mm2
        movd    eax,        mm2;
        mov     word ptr [edi+32],  ax;
// movd    [edi+32],   mm2
        psrlq   mm2,        32;
        movd    eax,        mm2;
        mov     word ptr [ebx+32],  ax;
// movd    [edi+160],  mm2;
        movq    mm3,        mm0;
        movq    mm2,        mm1;
        pfmul   mm3,        mm7; // b3*IW6
        pfmul   mm2,        mm4;// b2*IW2
        pfadd   mm2,        mm3;
        pxor    mm3,        mm3
        pfsub   mm3,        mm2//[edi+384]=-b2*IW2-b3*IW6;
        pf2id   mm3,        mm3
        movd    eax,        mm3;
        mov     word ptr [edi+96],  ax;
// movd    [edi+96],   mm3
        psrlq   mm3,        32;
        movd    eax,        mm3;
        mov     word ptr [ebx+96],  ax;
// movd    [edi+224],  mm3;
        movq    mm4,        FW5; // store FW5
        movq    mm7,        FW3; // store FW3
        movq    mm0,        mm5;
        movq    mm1,        mm6;
        pfmul   mm5,        mm4;
        pfmul   mm6,        mm7;
        pfadd   mm5,        mm6;
        pxor    mm6,        mm6
        pfsub   mm6,        mm5//[edi+192]=-b5*IW5-b6*IW3;
        pf2id   mm6,        mm6
        movd    eax,        mm6;
        mov     word ptr [edi+48],  ax;
// movd    [edi+48],   mm6
        psrlq   mm6,        32;
        movd    eax,        mm6;
        mov     word ptr [ebx+48],  ax;
// movd    [edi+176],  mm6;
        movq    mm5,        mm0;
        movq    mm6,        mm1;
        pfmul   mm5,        mm7;
        pfmul   mm6,        mm4;
        pfsub   mm5,        mm6;//[edi+320]=b5*IW3-b6*IW5;
        pf2id   mm5,        mm5
        movd    eax,        mm5;
        mov     word ptr [edi+80],  ax;
// movq    [edi+80],   mm5
        psrlq   mm5,        32;
        movd    eax,        mm5;
        mov     word ptr [ebx+80],  ax;
```

APPENDIX -continued

```
// movd    [edi+208],    mm5;
   add     esi,          64 ; move to comp row 1
   add     edi,          2
   add     ebx,          2
   dec     ecx;
   jnz     loop2;
   femms
}
return 0;
}
```

What is claimed is:

1. A method for performing a two-dimensional transform of a series of data blocks using a microprocessor having single-instruction-multiple-data (SIMD) instructions, wherein the method comprises:

receiving multiple data blocks;

grouping corresponding elements from each of the multiple data blocks to provide full data vectors for the SIMD instructions; and operating on the full data vectors with SIMD instructions to carry out the two dimensional transform on the multiple data blocks.

2. The method of claim 1, wherein the operating includes:

carrying out a linear transform on each row of the grouped elements with SIMD instructions, thereby producing grouped row-transform coefficients; and carrying out a linear transform on each column of the grouped row-transform coefficients, thereby producing grouped two-dimensional transform coefficients.

3. The method of claim 2, wherein the method further comprises:

isolating and distributing coefficients from the grouped two-dimensional transform coefficients to form multiple transform coefficient blocks that correspond to the received multiple data blocks.

4. The method of claim 3, wherein the linear transforms are discrete cosine transforms.

5. The method of claim 4, wherein the multiple data blocks consist of exactly two data blocks.

6. The method of claim 5, wherein the SIMD instructions include floating point instructions.

7. An information carrier medium configured to convey software to a general purpose computer system that supports SIMD instructions, wherein the software comprises a transform module having:

an input interface configured to receive multiple data blocks;

code configured to collect and assemble respective elements of the multiple data blocks to form data vectors, wherein the relationship between the elements of the multiple data blocks and the data vectors, once established, is maintained unaltered in the transform module;

SIMD instructions configured to operate on the data vectors to carry out a two-dimensional transform of the multiple data blocks in parallel; and code configured to extract and arrange elements of the data vectors to produce multiple blocks of transform coefficients corresponding to the received multiple data blocks.

8. The medium of claim 7, wherein the SIMD instructions include:

instructions to perform a linear transform on each row of the data vectors to generate a buffer of intermediate results; and instructions to perform a linear transform on each column of the buffer of intermediate results.

9. The medium of claim 8, wherein the linear transforms are discrete cosine transforms.

10. The medium of claim 9, wherein the multiple data blocks consist of exactly two data blocks.

11. The medium of claim 10, wherein the SIMD instructions include floating point instructions.

12. The medium of claim 11, wherein the medium is a digital information storage medium that is one of a set consisting of: printed paper, punched paper, magnetic tape, magnetic disk, optical disk, redundant array of independent disks, non-volatile memory array, and volatile memory array.

13. The medium of claim 11, wherein the medium is an information transmission medium that is one of a set consisting of: a phone line, a television cable, a wireless link, a satellite link and the Internet.

14. A computer that comprises:

memory storing application software and multimedia data; and a processor that implements a floating point SIMD instruction set, wherein the processor is coupled to the memory and configured to execute the application software, wherein the application software includes:

a first module which configures the processor to receive multiple blocks of the multimedia data;

a second module which configures the processor to transform the multiple blocks of multimedia data in parallel, wherein the second module includes:

a first set of instruction code that configures the processor to collect respective elements from each of the multiple blocks and to assemble the respective elements in a plurality of registers so that each register has a single element from each of the multiple blocks;

a first set of SIMD floating point instructions that operate on the register contents to produce row transform coefficients of the multiple blocks, wherein each of the plurality of registers has a single row transform coefficient from each of the multiple blocks;

a second set of SIMD floating point instructions that operate on the register contents to produce two-dimensional transform coefficients of the multiple blocks, wherein each of the plurality of registers has a single two-dimensional coefficient from each of the multiple blocks; and a second set of instruction code that configures the processor to isolate and arrange the two-dimensional transform coefficients to form multiple transform coefficient blocks that correspond to the originally received multiple blocks.

15. The computer of claim 14, wherein the first set of SIMD floating point instructions implement a discrete cosine transform, and wherein the second set of SIMD floating point instructions also implement a discrete cosine transform.

16. The computer of claim 15, wherein the multiple blocks of multimedia consist of exactly two data blocks.

* * * * *

UNITED STATES PATENT AND TRADEMARK OFFICE
CERTIFICATE OF CORRECTION

PATENT NO. : 6,742,010 B1
DATED : May 25, 2004
INVENTOR(S) : Wei-Lien Hsu and Frank J. Gorishek It is certified that error appears in the above-identified patent and that said Letters Patent is hereby corrected as shown below:

Title page,
Item [54], Title, please change to -- DUAL-BLOCK DISCRETE COSINE TRANSORM METHOD --
Item [75], Inventors should read -- Wei-Lien Hsu and Frank J. Gorishek --

Signed and Sealed this

Seventeenth Day of August, 2004

JON W. DUDAS
*Acting Director of the United States Patent and Trademark Office*